(12) United States Patent
Fan

(10) Patent No.: US 7,746,867 B2
(45) Date of Patent: *Jun. 29, 2010

(54) SYSTEM AND METHOD FOR FAULT TOLERANT TCP OFFLOAD

(75) Inventor: Kan Frankie Fan, Diamond Bar, CA (US)

(73) Assignee: Broadcom Corporation, Irvine, CA (US)

( * ) Notice: Subject to any disclaimer, the term of this patent is extended or adjusted under 35 U.S.C. 154(b) by 336 days.

This patent is subject to a terminal disclaimer.

(21) Appl. No.: 11/696,398

(22) Filed: Apr. 4, 2007

(65) Prior Publication Data

US 2007/0263630 A1 Nov. 15, 2007

Related U.S. Application Data

(63) Continuation of application No. 10/337,029, filed on Jan. 6, 2003, now Pat. No. 7,224,692.

(60) Provisional application No. 60/408,207, filed on Sep. 4, 2002.

(51) Int. Cl.
*H04L 12/28* (2006.01)
*H04L 12/56* (2006.01)

(52) U.S. Cl. .................... 370/394; 370/389; 370/474

(58) Field of Classification Search ................ 370/389, 370/394, 395.52, 474; 709/227–229
See application file for complete search history.

(56) References Cited

U.S. PATENT DOCUMENTS

| 5,727,142 | A | 3/1998 | Chen |
| 6,345,301 | B1 | 2/2002 | Dagana et al. |
| 6,434,620 | B1 * | 8/2002 | Boucher et al. ............. 709/230 |
| 6,788,704 | B1 | 9/2004 | Lindsay |
| 6,938,092 | B2 * | 8/2005 | Burns .......................... 709/230 |
| 7,295,555 | B2 * | 11/2007 | Elzur .......................... 370/394 |
| 2002/0167948 | A1 * | 11/2002 | Chen .......................... 370/392 |
| 2003/0200284 | A1 | 10/2003 | Philbrick et al. |
| 2004/0042464 | A1 * | 3/2004 | Elzur et al. ............. 370/395.52 |
| 2004/0044796 | A1 | 3/2004 | Vangal et al. |
| 2004/0062245 | A1 | 4/2004 | Sharp et al. |
| 2005/0175003 | A1 * | 8/2005 | Craft et al. .................. 370/389 |

OTHER PUBLICATIONS

Manish Marwah, A System Demonstrating ST-TCP Proceedings of the 2005 IEEE International Conference on Dependable Systems and Networks (DSN 2005), Yokohama, Japan (Jun. 2005).*
European Search Report, EP 03019999, Oct. 27, 2004.

* cited by examiner

*Primary Examiner*—William Trost, IV
*Assistant Examiner*—Emmanuel Maglo
(74) *Attorney, Agent, or Firm*—McAndrews, Held & Malloy, Ltd.

(57) ABSTRACT

Systems and methods that provide fault tolerant transmission control protocol (TCP) offloading are provided. In one example, a method that provides fault tolerant TCP offloading is provided. The method may include one or more of the following steps: receiving TCP segment via a TCP offload engine (TOE); calculating a TCP sequence number; writing a receive sequence record based upon at least the calculated TCP sequence number to a TCP sequence update queue in a host; and updating a first host variable with a value from the written receive sequence record.

22 Claims, 9 Drawing Sheets

SYSTEM AND METHOD FOR FAULT TOLERANT TCP OFFLOAD

RELATED APPLICATIONS

This application a CONTINUATION of U.S. application Ser. No. 10/337,029, filed Jan. 6, 2003, now U.S. Pat. No. 7,224,692, which claims priority to and claims benefit from U.S. Provisional Patent Application Ser. No. 60/408,207, entitled "System and Method for Fault Tolerant TCP Offload" and filed on Sep. 4, 2002. The above-identified applications are hereby incorporated herein by reference in their entirety.

INCORPORATION BY REFERENCE

The above-referenced United States patent application is hereby incorporated herein by reference in its entirety.

BACKGROUND OF THE INVENTION

Transmission control protocol (TCP) connections may be offloaded to a dedicated TCP offload engine (TOE) to increase performance and to reduce host CPU utilization. Some TCP state variables (e.g., a TCP sequence number (TCP_SEQ), a TCP acknowledgement number (TCP_ACK), etc.) are managed entirely by the dedicated TOE after the TCP connection is offloaded. However, using the TOE increases the risk of an unreliable TCP connection. For example, in the event of a TOE hardware failure, the values of the TCP variables are lost. The host CPU must then terminate the TCP connection.

Further limitations and disadvantages of conventional and traditional approaches will become apparent to one of ordinary skill in the art through comparison of such systems with aspects of the present invention as set forth in the remainder of the present application with reference to the drawings.

BRIEF SUMMARY OF THE INVENTION

Aspects of the present invention may be found in, for example, systems and methods that provide fault tolerant TCP offloading. In one embodiment, the present invention may provide a method that provides fault tolerant TCP offloading. The method may include, for example, one or more of the following steps: receiving a TCP segment via a TOE; calculating a TCP sequence number; writing a receive sequence record based upon at least the calculated TCP sequence number to a TCP sequence update queue in a host; and updating a first host variable with a value from the written receive sequence record.

In another embodiment, the present invention may provide a system that provides fault tolerant TCP offloading. The system may include, for example, a host coupled to a TOE. The host may include, for example, a first host variable storage buffer and a TCP sequence update data structure. A TCP segment may be received by the TOE. A TCP sequence number may be calculated based upon the received TCP segment. A receive sequence record based upon at least the calculated TCP sequence number may be written to the TCP sequence update data structure. The first host variable storage buffer may be updated with a value from the written receive sequence record.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
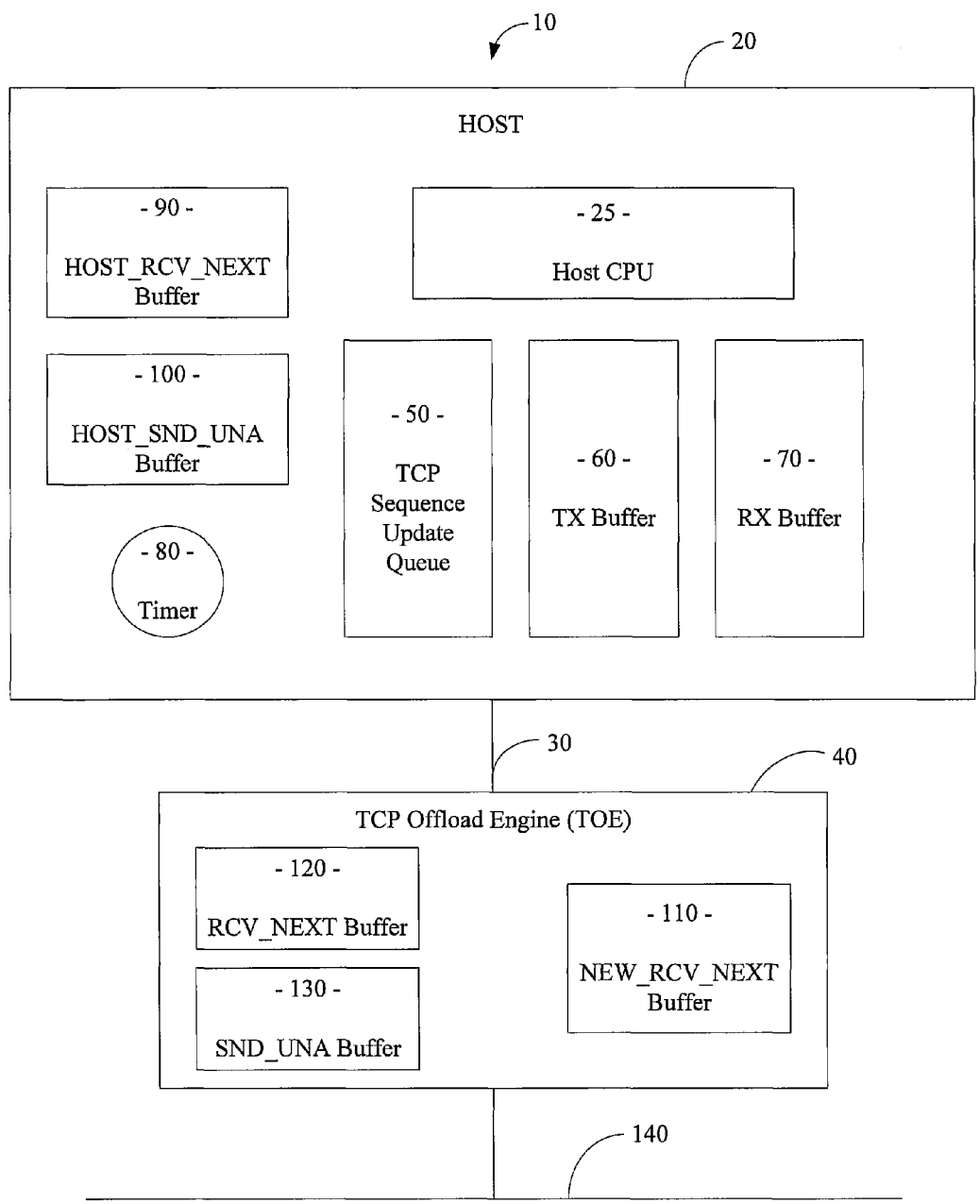
FIG. 1 shows a block diagram of an embodiment of a system that provides fault tolerant TCP offload according to the present invention.

FIG. 1 shows a block diagram of an embodiment of a system that provides fault tolerant TCP offload according to the present invention. The system 10 may include, for example, a host 20, a host interface 30 and a TOE 40. The host 20 may include, for example, a host CPU 25, a TCP sequence update queue 50, a transmission (TX) buffer 60, a reception (RX) buffer 70, a timer 80, a HOST_RCV_NEXT buffer 90 and a HOST_SND_UNA buffer 100. Although some components may be described as queues or buffers, the present invention contemplates that other memory structures or storage structures may be used. The TOE 40 may include, for example, a NEW_RCV_NEXT buffer 110, an RCV_NEXT buffer 120 and an SND_UNA buffer 130. The host 20 may be coupled to the TOE 40 via the host interface 30, which may be, for example, a peripheral component interconnect (PCI). The TOE 40 may also be coupled to a physical communications medium 140 such as, for example, an Ethernet.

The operations of an embodiment of the system 10 according to the present invention may be categorized into at least four phases: initialization, protocol processing, fault detection and corrective action.

Figure 2:
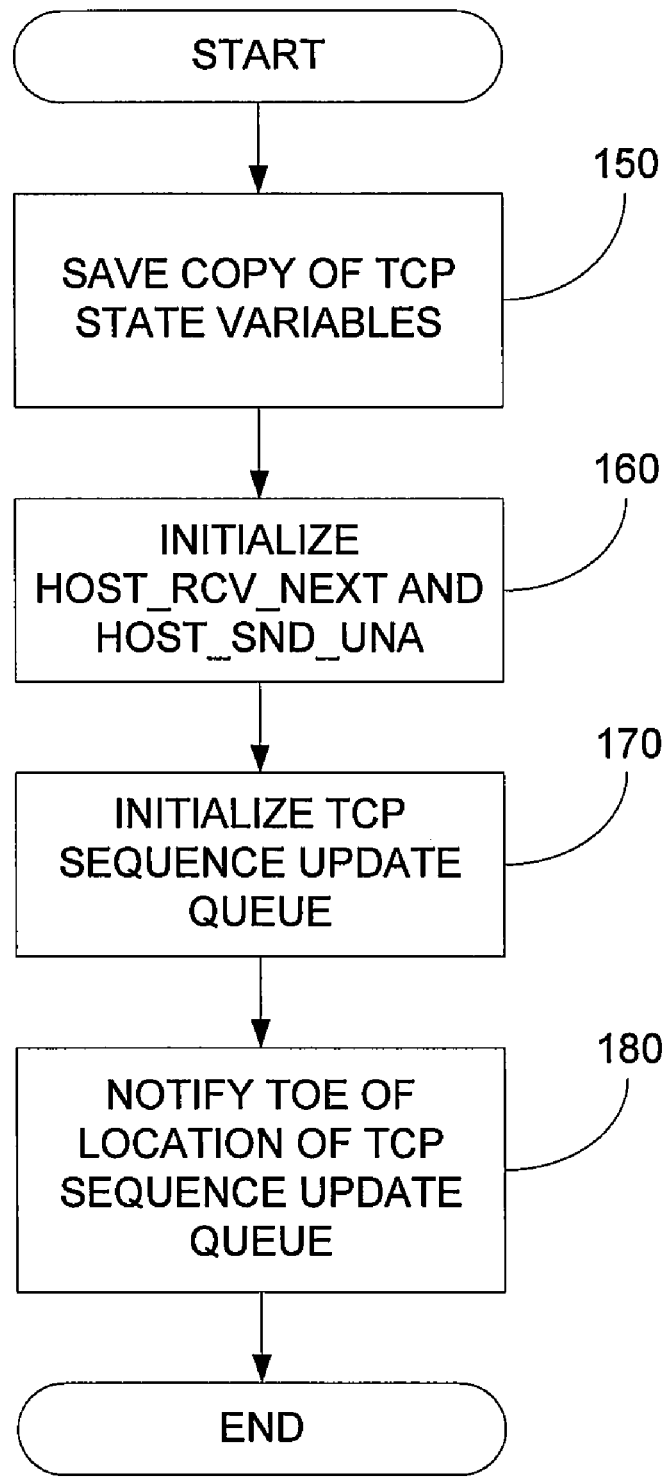
FIG. 2 shows a flow chart illustrating an embodiment of an initialization process carried out by a host according to the present invention.

FIG. 2 shows a flow chart illustrating an embodiment of an initialization process carried out by the host (e.g., a host CPU) according to the present invention. In step 150, the host 20 may save a copy of all TCP state variables. In step 160, the host 20 may initialize and may maintain a variable indicating a host sequence number based upon the next received segment (i.e., a HOST_RCV_NEXT variable). The HOST_RCV_NEXT variable, which may be stored in the HOST_RCV_NEXT buffer 90, may be set to a RCV_NEXT variable, which may be stored in the RCV_NEXT buffer 120 of the TOE 40. The host 20 may initialize and may maintain a variable indicating a host sequence number for the first un-acknowledged data (i.e., a HOST_SND_UNA variable). The HOST_SND_UNA variable, which may be stored in the HOST_SND_UNA buffer 100, may be set to the SND_UNA variable, which may be stored in the SND_UNA buffer 130 of the TOE 40. In step 170, the TCP sequence update queue 50 may be initialized. In step 180, the host 20 may notify, via the host interface 30, the TOE 40 of the location of the TCP sequence update queue 50 in the host buffers. The TOE 40 may save the address of the TCP sequence update queue 50.

Figure 3A:
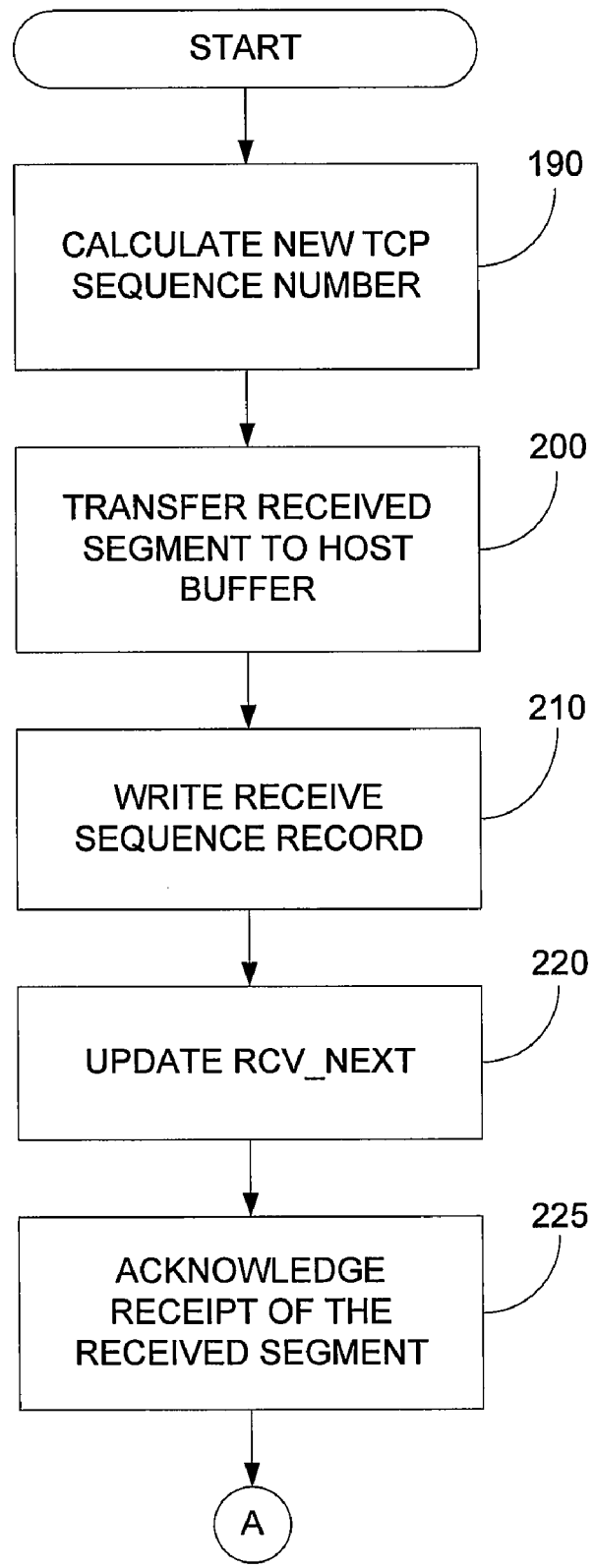
FIGS. 3A-B show a flow chart illustrating an embodiment of protocol processing by a TCP offload engine according to the present invention.
Figure 3B:
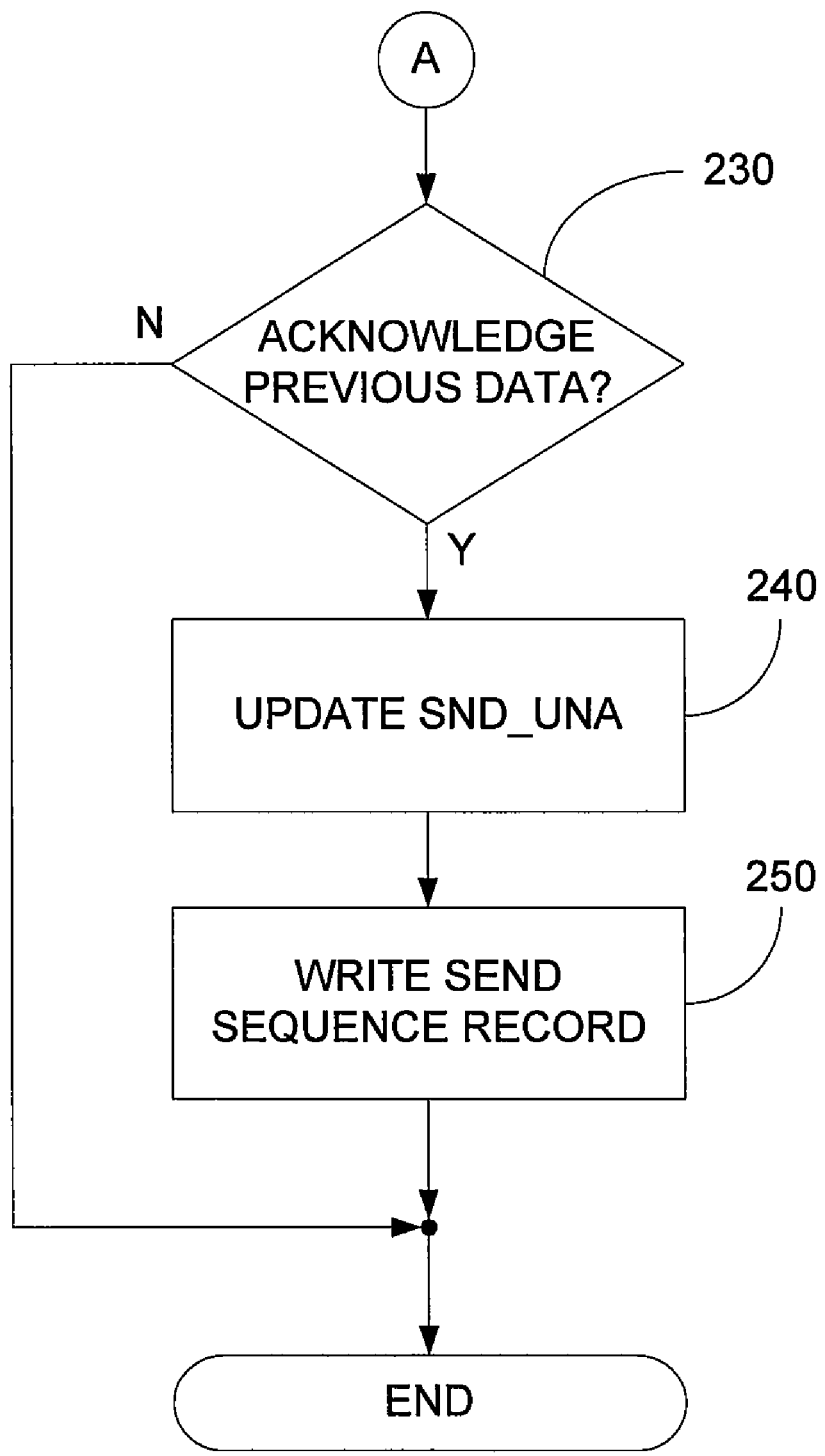

FIGS. 3A-B show a flow chart illustrating an embodiment of protocol processing by the TOE according to the present invention. FIG. 3A shows that, for TCP segments received in order from the physical communications medium (e.g., the Ethernet), the TOE may perform one or more of the steps as set forth below. In step 190, the TOE may calculate a new TCP received sequence number. The new TCP received sequence number may be stored in the NEW_RCV_NEXT buffer 110. In step 200, the TOE 40 may transfer the received segment or a portion thereof to a host buffer. In one example, the TOE 40 may employ a direct memory access (DMA) engine to place the received segment in the RX buffer 70. The received segment may include, for example, a payload, a data segment, etc. In step 210, the TOE may write a receive sequence record with the new TCP received sequence number to the TCP sequence update queue 50. In step 220, the RCV_NEXT variable stored in the RCV_NEXT buffer 120 may be updated with the new TCP received sequence number. In step 225, the TOE may use RCV_NEXT to generate an outgoing TCP segment which acknowledges the receipt of the received TCP segment being placed into host buffer.

In query 230, the TOE may determine for every TCP segment received whether the TCP segment acknowledges previously sent data. If the previously sent data is not acknowledged, then the process may be complete. If the previously sent data is acknowledged, then, in step 240, the SND_UNA variable stored in the SND_UNA buffer 130 may be updated with the new TCP received sequence number. In step 250, a send sequence record with the updated SND_UNA value may be written to the TCP sequence update queue 50.

Figure 4:
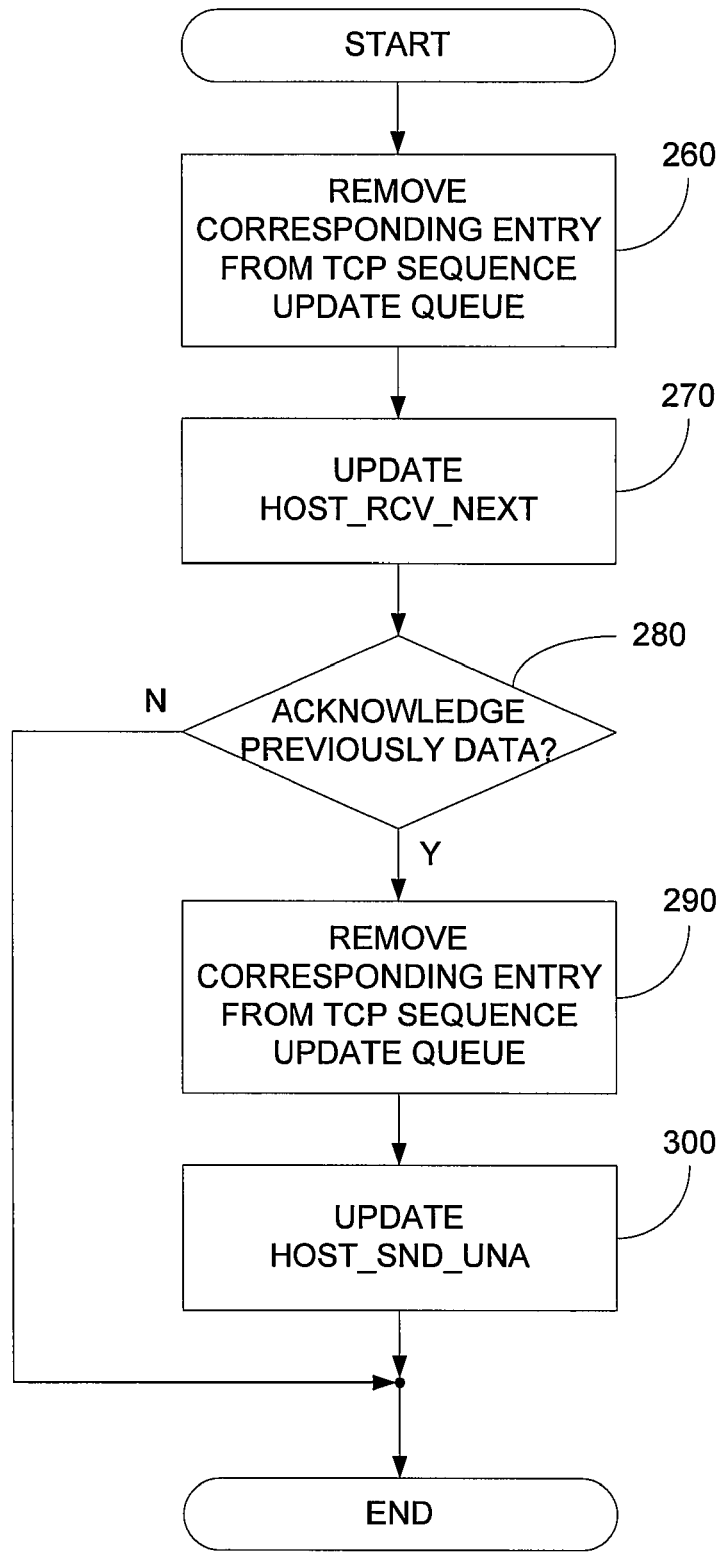
FIG. 4 shows a flow chart illustrating an embodiment of protocol processing by a host according to the present invention.

FIG. 4 shows a flow chart illustrating an embodiment of protocol processing by the host according to the present invention. For every TCP segment received in order, the host (e.g., host CPU) may, in step 260, remove the corresponding entry from the TCP sequence update queue 50. The corresponding entry may be, for example, the receive sequence record written into the TCP sequence update queue 50. In step 270, the host 20 may update HOST_RCV_NEXT variable stored in the HOST_RCV_NEXT buffer 90 with the value from the removed (e.g., de-queued) entry. In query 280, the host 20 may determine whether the TCP segment acknowledges previously sent data. If the previously sent data is not acknowledged, then the process may be complete. If the previously sent data is acknowledged, then, in step 290, a corresponding entry from the TCP sequence update queue may be removed. The corresponding entry may be, for example, the send sequence record written into the TCP sequence update queue 50. In step 300, the HOST_SND_UNA variable stored in the HOST_SND_UNA buffer 100 may be updated with the value in the de-queued entry.

Figure 5A:
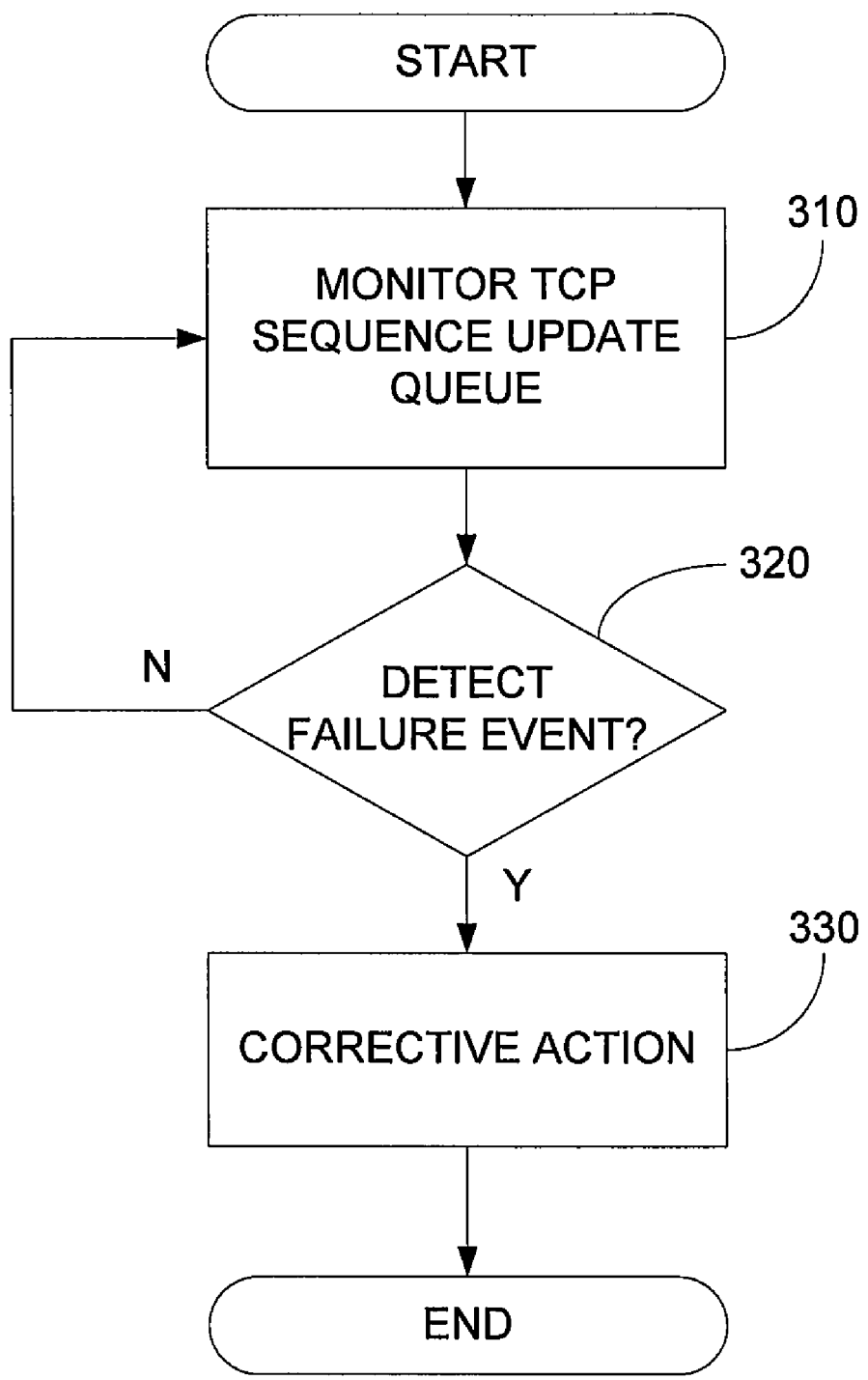
FIGS. 5A-B show flow charts illustrating embodiments of processes that detect faults according to the present invention.
Figure 5B:
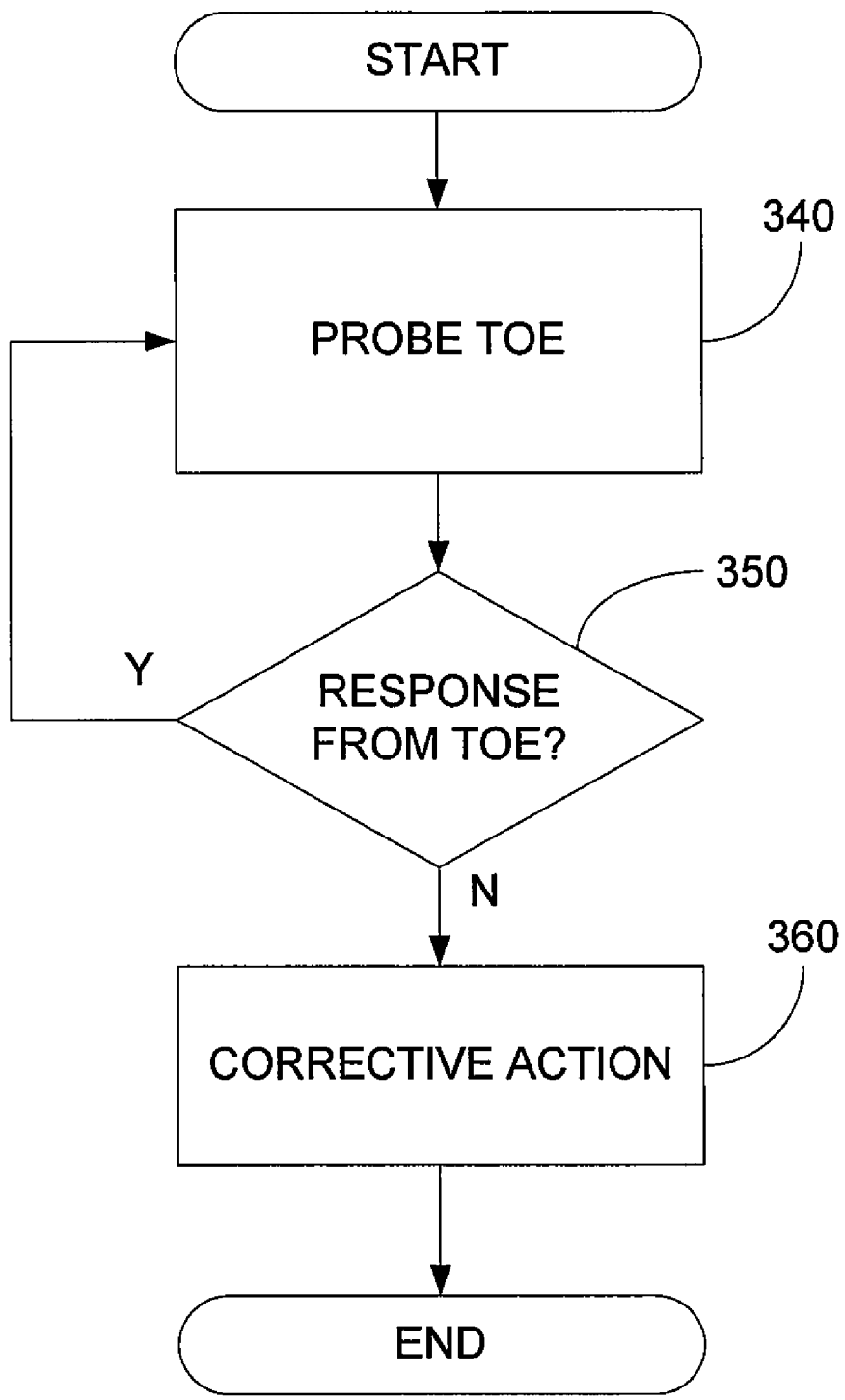

FIGS. 5A-B show flow charts illustrating embodiments of processes that detect faults according to the present invention. FIG. 5A shows a flow chart of an embodiment of a process that monitors for a failure event generated by the TOE 40 according to the present invention. In step 310, the host 20 (e.g., the host CPU 25) may monitor the TCP sequence update queue 50. The host 20 may search for a failure event (e.g., a hardware failure event) that may have been generated by the TOE 40. In query 320, the host 20 may determine whether a failure has occurred, for example, in the TOE 40. If the host 20 does not detect a failure event, then the process may loop back to step 310. If the host 20 does detect a failure event (e.g., detects a hardware failure event generated by the TOE 40), then the, in step 330, corrective action may be taken as set forth below.

FIG. 5B shows a flow chart of an embodiment of a process that probes the TOE according to the present invention. In step 340, the host 20 may probe the TOE 40. For example, the host may use the timer 80 to periodically probe the TOE 40. In query 350, the host 20 may determine whether the TOE has responded to the probe in a timely manner. If a proper response to the probe is received by the host 20 from the TOE 40 within a particular period of time, then the TOE 40 may be considered not to have failed and the process may loop back to step 340. If an improper response to the probe is received by the host 20 from the TOE 40, then the host 20 may consider the TOE 40 to have failed. An improper response may be, for example, no response, an improperly formed response or a late response (i.e., received after the elapse of a particular period of time).

In an embodiment of a process that detects faults according to the present invention, the TOE 40 may try with its best efforts to report a hardware failure by transferring all the TCP state variables to the host 20 (e.g., the host CPU 25) via the TCP sequence update queue.

Figure 6A:
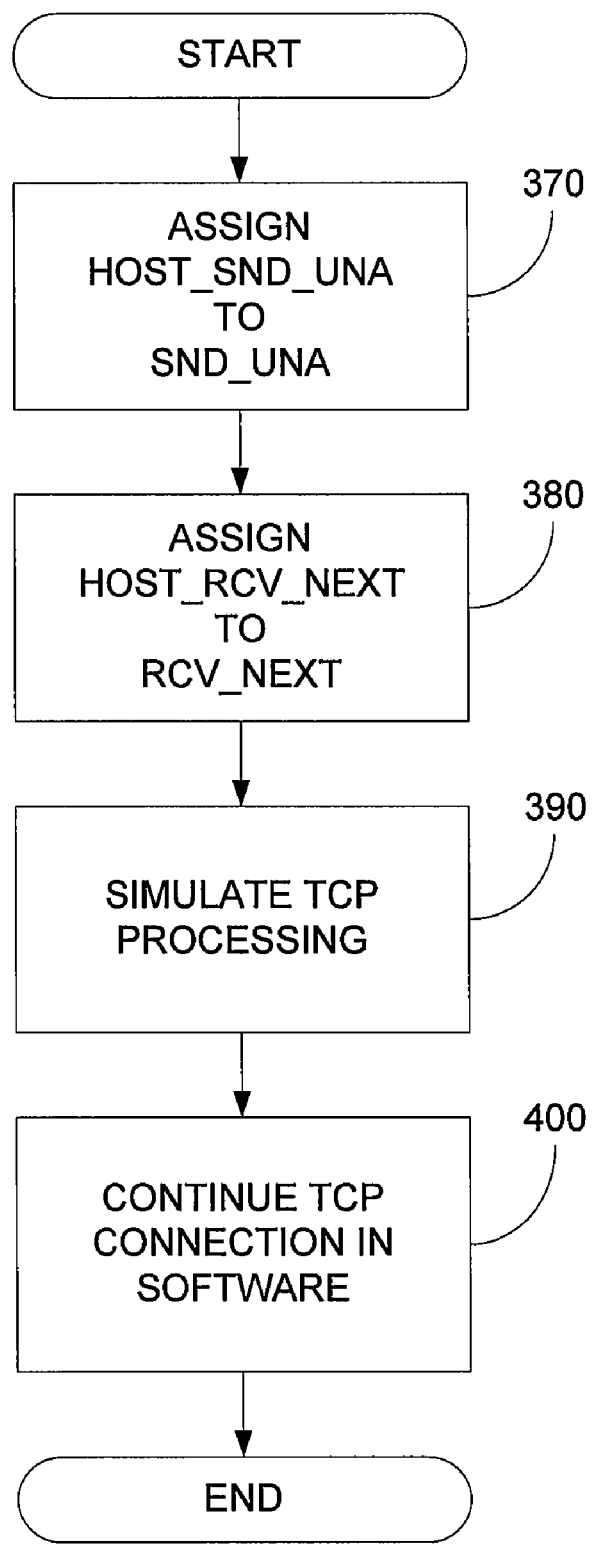
FIGS. 6A-B show flow charts illustrating embodiments of processes that provide corrective action according to the present invention.
Figure 6B:
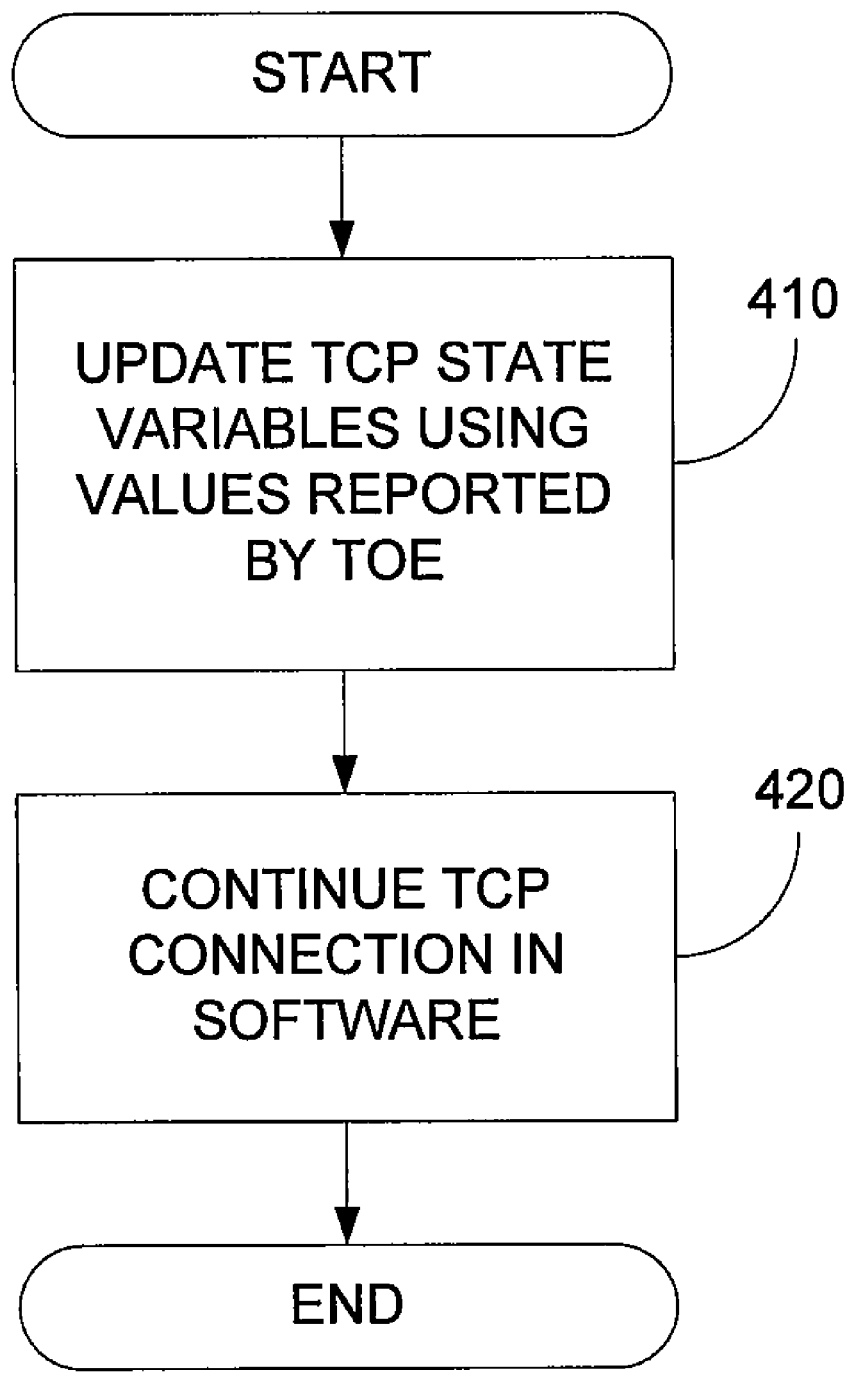

FIGS. 6A-B show flow charts illustrating embodiments of processes that provide corrective action according to the present invention. FIG. 6A shows a flow chart illustrating an embodiment of a process that provides corrective action if the fault is detected via an improper response to a probe according to the present invention. For example, if the fault is detected via a timeout, then corrective action may take place including one or more of the steps as set forth below. In step 370, the host 20 (e.g., the host CPU) may assign the HOST_SND_UNA variable to the SND_UNA variable. In step 380, the host 20 may assign the HOST_RCV_NEXT variable to the RCV_NEXT variable. In step 390, the host 20 may simulate TCP processing when the TCP retransmission timer is triggered. In step 400, the host continues the TCP connection in software. In one example, the host 20 may use another network interface (e.g., network interface card (NIC)) instead of the TOE 40.

FIG. 6B shows a flow chart illustrating an embodiment of a process that provides corrective action if the fault is reported by the TOE 40 according to the present invention. In step 410, the host 20 may update the TCP state variables using the values reported by the TOE 40 via the TCP sequence update queue 50. In step 420, the host may continue the TCP connection in software. In one example, the host may continue the TCP connection in software using the updated TCP state variables.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. In a Transmission Control Protocol (TCP) Offload Engine (TOE), a method for providing fault tolerant TCP offloading, the method comprising:
   receiving a TCP segment;
   calculating a TCP received sequence number based upon the received TCP segment;
   updating a value of a first TOE variable with the TCP received sequence number; and
   writing a receive sequence record based upon at least the TCP received sequence number to a TCP sequence update queue of a host, where the written receive sequence record causes the host to update a first host variable with the TCP received sequence number.

2. The method of claim 1, wherein the written receive sequence record causes the host to remove the written receive sequence record from the TCP sequence update queue.

3. The method of claim 1, further comprising, after writing the receive sequence record to the TCP sequence update queue in the hose, updating a value of a second TOE variable with the TCP received sequence number.

4. The method of claim 1, further comprising, if the received TCP segment acknowledges previously sent data, then:
   updating a value of a second TOE variable with the TCP received sequence number; and
   writing a send sequence record based upon at least the TCP received sequence number to the TCP sequence update queue, where the written send sequence record causes the host to update a second host variable with the TCP received sequence number.

5. The method of claim 4, wherein the written send sequence record causes the host to remove the written send sequence record from the TCP sequence update queue.

6. The method of claim 4, further comprising, if a fault is detected in the TOE, then causing the host to continue a TCP connection in software using at least one of the first host variable, the second host variable and the TCP sequence update queue.

7. The method of claim 1, further comprising, if a fault is detected in the TOE, then causing the host to continue a TCP connection in software.

8. The method of claim 7, wherein causing the host to continue a TCP connection in software comprises writing information to the TCP sequence update queue.

9. The method of claim 7, wherein causing the host to continue a TCP connection in software comprises causing the host to update TCP state variables using values reported by the TOE via the TCP sequence update queue.

10. The method of claim 7, wherein causing the host to continue a TCP connection in software comprises failing to respond properly to probing by the host.

11. The method of claim 1, further comprising transferring at least a payload of the received TCP segment to a host buffer via a direct memory access (DMA) engine.

12. In a Transmission Control Protocol (TCP) Offload Engine (TOE), a method for providing fault tolerant TCP offloading, the method comprising:
   receiving a TCP segment;
   calculating a TCP received sequence number based upon the received TCP segment; and
   if the received TCP segment acknowledges previously sent data, then at least:
      updating a value of a TOE variable with the TCP received sequence number; and
      writing a send sequence record based upon at least the TCP received sequence number to a TCP sequence update queue of a host, where the written send sequence record causes the host to update a value of a host variable with a value from the written send sequence record.

13. The method of claim 12, further comprising updating a value of a first TOE variable with the TCP received sequence number.

14. The method of claim 13, further comprising writing a receive sequence record based upon at least the TCP received sequence number to the TCP sequence update queue.

15. The method of claim 12, wherein the written send sequence record causes the host to remove the written send sequence record from the TCP sequence update queue.

16. The method of claim 12, further comprising, if a fault is detected in the TOE, then causing the host to continue a TCP connection in software.

17. The method of claim 16, wherein causing the host to continue a TCP connection in software comprises writing information to the TCP sequence update queue.

18. The method of claim 16, wherein causing the host to continue a TCP connection in software comprises causing the host to update TCP state variables using values reported by the TOE via the TCP sequence update queue.

19. The method of claim 16, wherein causing the host to continue a TCP connection in software comprises failing to respond properly to probing by the host.

20. The method of claim 12, further comprising transferring at least a payload of the received TCP segment to a host buffer via a direct memory access (DMA) engine.

21. In a Transmission Control Protocol (TCP) Offload Engine (TOE) for providing fault tolerant TCP offloading from a host, at least one circuit that operates to, at least:
   receive a TCP segment;
   calculate a TCP received sequence number based upon the received TCP segment;
   update a value of a first TOE variable with the TCP received sequence number; and
   write a receive sequence record based upon at least the TCP received sequence number to a TCP sequence update data structure of a host, where the written receive sequence record causes the host to update a first host variable with the TCP received sequence number.

22. In a Transmission Control Protocol (TCP) Offload Engine (TOE) for providing fault tolerant TCP offloading from a host, at least one circuit that operates to, at least:
   receive a TCP segment;
   calculate a TCP received sequence number based upon the received TCP segment; and
   if the received TCP segment acknowledges previously sent data, then at least:
      update a value of a TOE variable with the TCP received sequence number; and
      write a send sequence record based upon at least the TCP received sequence number to a TCP sequence update queue of a host, where the written send sequence record causes the host to update a value of a host variable with a value from the written send sequence record.

* * * * *